United States Patent [19]

Ushiyama et al.

[11] Patent Number: 4,982,084
[45] Date of Patent: Jan. 1, 1991

[54] METHOD FOR ATTACHING PULSE ENCODER TO MOTOR AND MOTOR ATTACHED WITH SAME

[75] Inventors: Shigeyuki Ushiyama; Tomonaga Yamamoto, both of Hino, Japan

[73] Assignee: Fanuc Limited, Yamanashi, Japan

[21] Appl. No.: 233,645

[22] PCT Filed: Nov. 19, 1987

[86] PCT No.: PCT/JP87/00895
§ 371 Date: Jul. 21, 1988
§ 102(e) Date: Jul. 21, 1988

[87] PCT Pub. No.: WO88/04030
PCT Pub. Date: Jun. 2, 1988

[30] Foreign Application Priority Data

Nov. 27, 1986 [JP] Japan .............. 61-280650

[51] Int. Cl.⁵ ......................................... G01D 5/34
[52] U.S. Cl. ........................... 250/231.14; 250/231.16
[58] Field of Search ........ 250/231 SE, 237 G, 231.14, 250/231.17, 231.18, 231.16; 341/13

[56] References Cited

U.S. PATENT DOCUMENTS

| | | | |
|---|---|---|---|
| 4,604,521 | 8/1986 | Takekoshi et al. | 250/231 SE |
| 4,737,635 | 4/1988 | Uchida | 250/231 SE |
| 4,775,787 | 10/1988 | Ushiyama et al. | 250/237 G |
| 4,794,250 | 12/1988 | Togami | 250/231 SE |
| 4,833,316 | 5/1989 | Yoneda | 250/237 G |

FOREIGN PATENT DOCUMENTS

| | | |
|---|---|---|
| 36-32924 | 12/1961 | Japan . |
| 54-85055 | 7/1979 | Japan . |
| 55-44249 | 3/1980 | Japan . |
| 56-151311 | 11/1981 | Japan . |
| 57-119217 | 7/1982 | Japan . |
| 57-137813 | 8/1982 | Japan . |
| 58-9023 | 1/1983 | Japan . |
| 59-54918 | 3/1984 | Japan . |
| 59-155716 | 9/1984 | Japan . |

Primary Examiner—David C. Nelms
Assistant Examiner—Stephone B. Allen
Attorney, Agent, or Firm—Armstrong, Nikaido, Marmelstein, Kubovcik & Murray

[57] ABSTRACT

When a pulse encoder is attached to a motor, first a stationary coded plate (20) is temporarily held on one end (18) of a motor housing (12) to modify a deviation thereof during a rotation of the motor housing (12) around an output shaft (14) of the motor, then a gauge (50) is interposed between said stationary coded plate (20) and a rotary coded plate (48) to separate them from the other by a prescribed distance, and next the output shaft (14) is rotated relative to the motor housing (12) to modify a deviation of the rotary coded plate (48) temporarily fixed to the sleeve member (42). According to the above method, the pulse encoder is accurately and efficiently attached to the motor.

8 Claims, 2 Drawing Sheets

METHOD FOR ATTACHING PULSE ENCODER TO MOTOR AND MOTOR ATTACHED WITH SAME

TECHNICAL FIELD

The present invention relates to a method for attaching a pulse encoder to be built in a motor to the motor, and relates to the motor having the pulse encoder attached thereto by that method.

BACKGROUND ART

A method whereby a rotary coded plate is first attached and then a stationary coded plate is attached on the basis of the rotary coded plate, is adopted in the prior art as a method for attaching the pulse encoder to the motor. Namely, the rotary coded plate is attached to one end of an output shaft of the motor so as to be at a right angle to a central axis of the shaft and centrally aligned. On the other hand, the stationary coded plate is fixed upon a plate member having a recess for mounting a light sensor, by an adhesive agent, and the position of the light sensor is adjusted in two dimensions (in a plane) with regard to the positions of slits of the stationary coded plate, and the light sensor is fixed by screws. A spacer is interposed between the plate element and one end of the motor so that the plate element having the light sensor and the stationary coded plate are separated from said rotary coded plate by a predetermined clearance distance, and the position of the plate element is adjusted in two-dimensional directions so that slits of the rotary coded plate are coaxial with slits of the stationary coded plate, and the plate element is fixed to one end of the motor by screws.

Conventionally, a pulse encoder is built in a motor in the manner mentioned above, but it is time-consuming to attach the pulse encoder to the motor in such a manner, and an accurate attachment thereof cannot be efficiently achieved. Namely, a working step is necessary whereby the stationary coded plate is mounted separately from one end of the motor and spaced from the first mounted rotary coded plate by a predetermined clearance distance. This clearance distance must be made shorter as a resolution power of the pulse encoder increases, and thus the adjustment work becomes more difficult. Furthermore, the position of the plate element having the stationary coded plate must be adjusted in two dimensional directions so that the positions of slits of the stationary coded plate are set coaxially with the positions of slits of the rotary coded plate.

DISCLOSURE OF THE INVENTION

Accordingly, an object of the present invention is to solve the above problems by providing a method for building each element of a pulse encoder in a motor accurately and efficiently, and thus provide a motor with the pulse encoder built therein by the above method.

In view of the above-mentioned object, the present invention provides a method for attaching a pulse encoder to a motor, characterized by temporarily attaching a stationary coded plate having a circular track pattern coaxial with slits thereof and provided with a light sensor, onto one end of a motor housing formed at a right angle to a central axis of an output shaft of the motor; rotating the motor housing around the output shaft to centrally align the stationary coded plate according to a deformation of the circular track pattern caused by a central deviation during rotation of the stationary coded plate; precisely fixing the stationary coded plate onto the one end of the motor housing; and inserting a sleeve attached the rotary coded plate thereon upon the output shaft from the one end, while interposing a clearance gauge between the stationary coded plate and the rotary coded plate and fixing same, to thereby set a clearance between the stationary coded plate and the rotary coded plate.

Furthermore, the present invention provides a motor having a pulse encoder attached thereto by the above method.

According to the above-mentioned method, the stationary coded plate can be centrally aligned by pushing same in one radial direction of the circular track pattern, and then the relative positioning of the rotary coded plate and the stationary coded plate can be accurately achieved by only the steps of, putting the clearance gauge on the stationary coded plate positioned by the central aligning; inserting the sleeve having the rotary coded plate attached thereon onto the output shaft; and fixing the sleeve to the shaft to cause the rotary coded plate to abut against the clearance gauge. Thus a motor having a highly accurate pulse encoder can be provided.

BEST MODE FOR CARRYING OUT THE INVENTION

Figure 1:
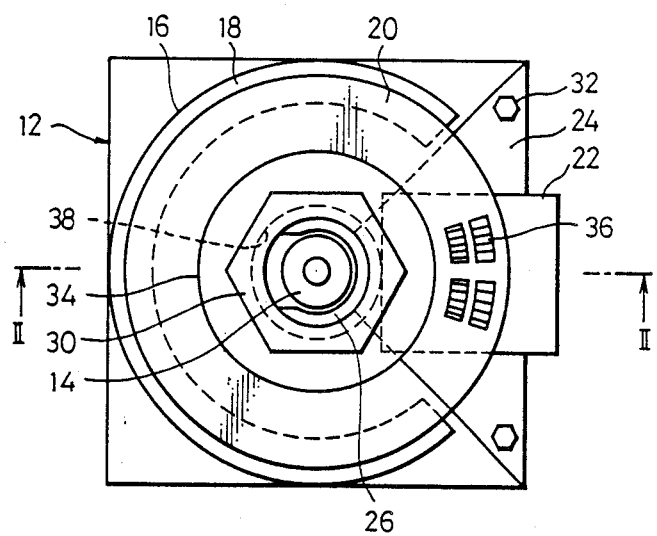
FIG. 1 is a plan view showing the attachment of a stationary coded plate of the pulse encoder according to the method of the present invention.
Figure 2:
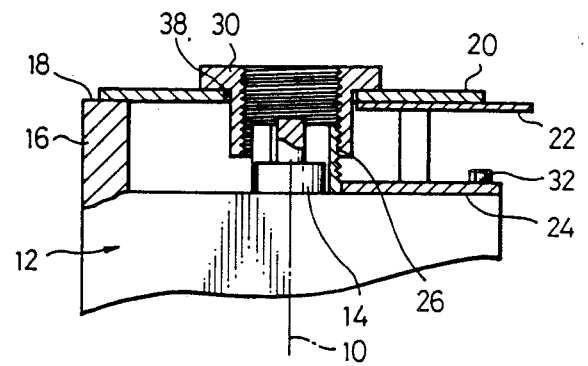
FIG. 2 is a longitudinal local sectional view of FIG. 1 taken along the line II—II.

Referring to FIGS. 1 and 2, a C shaped annular portion 16 is integrated with a rear end 12 of a motor housing. An end surface 18 of the annular portion 16 has been ground at a right angle to a central axis 10 of an output shaft 14 of the motor holding the shaft 14. On the other hand, a plate 22 having light sensors is adhered on an annular coded plate 20 to be fixed so that the light sensors correspond to slits 36 of the fixed stationary coded plate 20.

The stationary coded plate 20 having the light sensor plate 22 adhered thereon is placed on the end surface 18 of the C shaped annular portion 16 of the motor housing which is fixed to a work table (not shown) in a state such that a front end of the shaft 14 of the motor is directed downward. A triangular support plate 24 holding the other end of a half cylindrical member 26 provided with a threaded portion on the outer surface at least near one end of the member at one vertex portion thereof, is inserted through an open side of the C shaped annular portion 16 so that the half cylindrical threaded member 26 surrounds the shaft 14. Then, the remaining two vertex portions are fixed to the rear end portion 12 of the motor housing by screw members 32. After the member 26 is thus immovably fixed, the stationary coded plate 20 is temporarily pushed onto the end surface 18 of the annular portion 16 and held by a nut 30 extending through central hole 38.

The motor housing is rotated around the fixed shaft 14 in a state such that the stationary coded plate 20 is temporarily fixed as above-mentioned, and a circular track 34 for a central alignment is drawn on the stationary coded plate 20 coaxially with the slits 36. It can be accurately seen from the above, by a microscope, that the circular track 34 during rotation projects most at a position crossing an imaginary radius line extending through a center of the circular track 34 from a point of the central axis 10, and retracts most at the opposite position when the stationary coded plate 20 temporarily fixed to the motor housing is rotated with the motor housing, if the center of the circular track 34 is not positioned on the central axis 10 of the shaft 14. Therefore, a central alignment is achieved only by pushing the stationary coded plate 20 having a circular outer periphery in the direction of the center deviation by the amount of deviation, calculated on the basis of the amounts of the projection and the retraction, by a jig tool (not shown). Then, the stationary coded plate 20 is precisely fixed on the end surface 18 of the annular portion 16 by coating an adhesive including an epoxy resin, etc., around the stationary coded plate 20.

Figure 3:
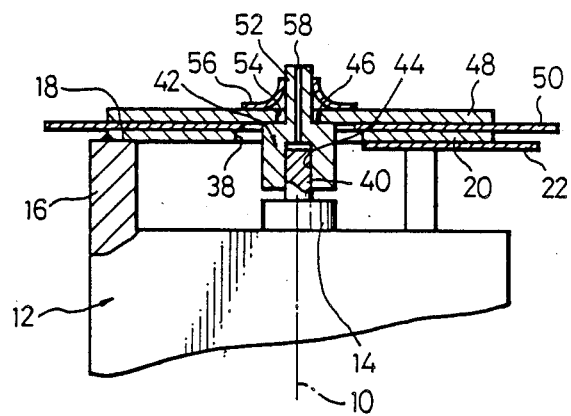
FIG. 3 is a longitudinal local sectional view showing one state of the working process whereby a rotary coded plate is attached on the basis of the stationary coded plate; and, FIG. 4 is a plan view of a spring plate ring.

Then, the triangular support plate 24 having the half cylindrical member 26 is removed by removing the nut 30 and the screws 32. Next, referring to FIG. 3, the method for attaching a rotary coded plate on the basis of the stationary plate 20 will be explained hereinafter.

Figure 4:
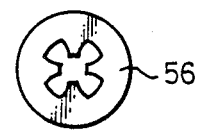

A clearance gauge 50 having a prescribed thickness is placed upon the stationary plate 20. On the other hand, the rotary coded plate 48 is temporarily held by pressure from a spring plate ring 56 (refer to FIG. 4) operating to apply the spring force thereof onto a shoulder 46 of a sleeve 42, which shoulder has a high flatness. The sleeve 42 is provided with a hole 44 having a prescribed depth, to enable a press-fit insertion onto a smaller portion 40 of the rear end of the shaft 14 at one end thereof, and with a smaller portion 52 on the other end thereof to form the shoulder 46. The sleeve 42 temporarily holding the rotary coded plate 48 is inserted onto the smaller portion 40 of the shaft 14, the portion 40 being coated with an adhesive, until the rotary coded plate 48 abuts against the gauge 50, and left in this state until the adhesive is hardened. Then, the gauge 50 is removed, and the rotary coded plate 48 is centrally aligned in the same manner as the stationary coded plate 20. Namely, a circular track for a coaxial centering with each slit is also drawn on the rotary coded plate 48. This centering is achieved by fixing the motor housing and by observing through a microscope the trace of a circular track when the output shaft is rotated. The size of a central hole 54 of the rotary coded plate 48 is a little larger than the size of the smaller portion 52 of the sleeve 42, and is smaller than the size of the shoulder, so that the rotary coded plate 48 is placed on the shoulder 46 such that it can be moved in a radial direction by a jig tool when it is to be centrally aligned. After this centering is completed, an adhesive is filled therein from above the spring plate ring 56 to fix the rotary coded plate 48 to the sleeve 42. A hole 58 having a small diameter formed along an axis of the sleeve 42 allows air to be exhausted when the sleeve 42 is inserted onto the smaller portion 40 of the shaft 14.

In this embodiment, the positioning of the light sensor plate 22 in alignment with the stationary coded plate 20 is easily effected because the former is directly fixed to the latter by an adhesive. Further, the positioning (centering) of the sleeve 42 in alignment with the rotary coded plate 48 can be achieved by a separate process because the fitting of the sleeve 42 and the smaller portion 40 of the shaft 14 can be accurately carried out. In such a case, the work efficiency for attaching the pulse encoder to the motor is further increased.

The following is apparent from the foregoing description. The stationary coded plate is mounted accurately at a right angle to the central axis for rotation because the stationary coded plate is placed on the large end surface of the motor housing, which surface is machined at a right angle to the central axis of the shaft of the motor, and the centering can be achieved only by pushing the stationary coded plate in the specific radial direction of the circular track, because the circular track for centering is drawn on the stationary coded plate so that any central deviation of the circular track is observed during rotation of the motor housing. Namely, the centering can be achieved only by an adjustment thereof in a one-dimensional direction of the radius thereof. On the other hand, the clearance between the rotary coded plate and the stationary coded plate can be set only by abutting the rotary coded plate temporarily held on a sleeve against a prescribed gauge placed on the stationary coded plate mounted in the above-mentioned manner. The centering of the rotary coded plate also can be achieved only by an adjustment thereof in a one-dimensional direction of the radius using a circular track for centering. Accordingly, the pulse encoder can be built into the motor accurately and efficiently, and thus a motor having the pulse encoder with a high detection performance can be provided.

We claim:

1. A method for attaching a pulse encoder to a motor comprising the steps of:
    (a) fixing a front end of a shaft of said motor to a work table directed downwardly such that an output shaft of said motor projects upwardly at a rear end within a portion of a housing of said motor having a plane end surface formed at a right angle to an axis of said output shaft;
    (b) fixing a stationary coded plate of said pulse encoder to said motor housing plane end surface by a process which includes:
        temporarily attaching said stationary coded plate to said housing surface such that a circular track pattern on said stationary coded plate surrounds said output shaft axis,
        rotating said motor housing around said output shaft to determine a deviation of a center of said circular track pattern from said axis,
        moving said stationary coded plate to make said circular track precisely centrally align with said axis, and then
        adhesively fixing said stationary coded plate to said housing plane end surface; and
    (c) attaching a rotary coded plate of said pulse encoder to said output shaft by a process which includes:
        inserting a sleeve, having said rotary coded plate attached thereon, upon said output shaft from said rear end with a clearance gauge interposed between said stationary coded plate and said rotary coded plate,
        moving said sleeve onto said output shaft until said rotary coded plate abuts said clearance gauge in contact with said stationary coded plate, and adhesively fixing said sleeve to said output shaft.

2. A method as recited in claim 1 which includes the further step:
   (d) attaching a light sensor of said pulse encoder to said stationary coded plate by an adhesive.

3. A method as recited in claim 1 wherein said process for attaching said rotary coded plate further includes rotating said shaft to determine a deviation of a center of a circular track pattern on said rotary coded plate from said output shaft axis, moving said rotary coded plate on said sleeve to precisely centrally align said center with said axis, and adhesively fixing said rotary coded plate to said sleeve.

4. A method as recited in claim 3 which includes the further step:
   (d) attaching a light sensor of said pulse encoder to said stationary coded plate by an adhesive.

5. A motor having a pulse encoder attached thereto, comprising:
   a motor having a housing and an output shaft,
   one end surface of the motor housing being formed as a plane at a right angle to a central axis of the output shaft of the motor,
   an annular stationary coded plate having a circular track pattern formed thereon coaxial with slits thereof, said stationary coded plate being fixed onto said plane end surface by an adhesive, coaxially with said central axis,
   a sleeve member fixed onto said output shaft by an adhesive through a central hole of said annular stationary coded plate, and
   a rotary coded plate with a circular track pattern fixed onto a shoulder of said sleeve member forming a step, coaxially with said central axis.

6. A motor having a pulse encoder according to claim 5, wherein said sleeve member has a small hole communicated with a hole accepting said output shaft.

7. A motor having a pulse encoder according to claim 5, wherein a spring plate ring is engaged with an end portion of said sleeve member to press said rotary coded plate onto said shoulder of said sleeve member.

8. A motor having a pulse encoder according to claim 7, wherein said sleeve member has a small hole communicated with a hole accepting said output shaft.

* * * * *